(12) United States Patent  (10) Patent No.: US 7,904,338 B2
Jamieson  (45) Date of Patent: Mar. 8, 2011

(54) DISPLAY DEVICE AND FUNDS TRANSACTION DEVICE INCLUDING THE DISPLAY DEVICE

(76) Inventor: Andrew Jamieson, East Brunswick (AU)

( * ) Notice: Subject to any disclaimer, the term of this patent is extended or adjusted under 35 U.S.C. 154(b) by 1743 days.

(21) Appl. No.: 10/516,445

(22) PCT Filed: May 7, 2003

(86) PCT No.: PCT/AU03/00543
§ 371 (c)(1),
(2), (4) Date: Nov. 30, 2004

(87) PCT Pub. No.: WO03/102785
PCT Pub. Date: Dec. 11, 2003

(65) Prior Publication Data
US 2005/0222925 A1    Oct. 6, 2005

(30) Foreign Application Priority Data
May 30, 2002 (AU) ........................................ PS2653

(51) Int. Cl.
*G06Q 20/00* (2006.01)
(52) U.S. Cl. ................. 705/16; 705/35; 705/39; 705/40; 705/44; 235/380
(58) Field of Classification Search ................... 705/16, 705/35, 44; 235/380
See application file for complete search history.

(56) References Cited

U.S. PATENT DOCUMENTS 5,615,110 A * 3/1997 Wong ............................ 705/38
5,822,435 A   10/1998 Boebert et al.
5,878,142 A    3/1999 Caputo et al.
6,010,067 A * 1/2000 Elbaum ......................... 235/380
6,016,480 A * 1/2000 Houvener et al. ............... 705/21

(Continued)

FOREIGN PATENT DOCUMENTS
EP           0587375 A       3/1994
(Continued)

OTHER PUBLICATIONS

International Search Report in European Appl. No. 03717043.8, dated Apr. 9, 2010, 4 pgs.

(Continued)

*Primary Examiner* — Vanel Frenel
(74) *Attorney, Agent, or Firm* — Sterne, Kessler, Goldstein & Fox PLLC (57) ABSTRACT

A display device is disclosed which may be used in a mobile telephone or other article which is intended to make secure transactions such as financial transactions, as well as other personal transactions such as telephone calls. The device includes a display (24) for displaying information, a financial transaction controller (26) including a processor (28), a display driver (30) for driving the display (24) and a secure memory (32). The financial transaction controller allows the display section (24), and an input keypad (12), to operate under the control of the device to enable personal functions other than financial transactions to be performed. However, in the event of a financial transaction, the financial transaction controller takes over control of the display section (24) and the input keypad (12) so that the financial transaction can be performed while the device is under the control of the financial transaction controller to thereby prevent tampering with or tapping off of data, and also the display of information other than under the control of the financial controller.

32 Claims, 4 Drawing Sheets

U.S. PATENT DOCUMENTS

| | | | |
|---|---|---|---|
| 6,084,968 A | 7/2000 | Kennedy et al. | |
| 6,202,054 B1 * | 3/2001 | Lawlor et al. | 705/42 |
| 2001/0037249 A1 * | 11/2001 | Fitzgerald et al. | 705/23 |
| 2004/0065728 A1 | 4/2004 | Tournier | |
| 2004/0263431 A1 | 12/2004 | Hohmann et al. | |

FOREIGN PATENT DOCUMENTS

| | | |
|---|---|---|
| WO | WO 9407219 | 3/1994 |
| WO | WO 9422116 | 9/1994 |
| WO | WO 01/09954 A | 2/2001 |
| WO | WO 0124123 | 4/2001 |
| WO | WO 02/059845 A | 8/2002 |
| WO | WO 03/030096 A | 4/2003 |

OTHER PUBLICATIONS

English language abstract for WO 01/09954, filed Feb. 8, 2001, 1 pg.

* cited by examiner

FIGURE 8

# DISPLAY DEVICE AND FUNDS TRANSACTION DEVICE INCLUDING THE DISPLAY DEVICE

FIELD OF THE INVENTION

This invention relates to a display device and funds transaction device including the display device, which enable financial transactions, such as EFTPOS transactions to be performed.

BACKGROUND ART

The technology required to transfer monies between one account to another is referred to as Electronic Funds Transfer (EFT). A device that is used for EFT to facilitate the payment of goods without the requirement of 'cash' money to change hands between the buyer and the seller is known as an Electronic Funds Transfer at the Point Of Sale (EFTPOS) device. EFTPOS networks are used around the world.

An EFTPOS device can be summarized as a device that accepts both secure (e.g., customer PINs) and insecure data (e.g., transaction amounts) from a keypad and sends this information to a banking EFTPOS network in a format that informs that network to perform a banking transaction. Secure information is encrypted, and messages are usually authenticated with a Message Authentication Code (MAC) that is the result of a modified encryption of the entire message. These encryption keys exist as part of a hierarchy that allows for the EFTPOS network to change their values throughout the life of the product. The EFTPOS device must ensure the safe keeping of these banking keys at all times.

As only secure data is returned from the keypad in an encrypted form, the EFTPOS device must be configured to prevent the customer from entering any secure information (e.g., PIN) when it is waiting for insecure information to be entered. That is, the EFTPOS device must allow for the customer to discern the difference between secure data entry and insecure data entry. Most usually this is achieved through the use of secure prompts. For example, an EFTPOS device will allow insecure data entry only when the user prompt has been checked by the banking authority to ensure that it contains no ambiguity as to its insecure nature. Therefore, a banking authority would not allow any "secure prompt" that contained an expression similar to 'Enter PIN', as this could be used to prompt the customer to enter their PIN when it would not be encrypted.

Thus an EFTPOS device can be said to have the following tasks:
1) The entry of data from a keypad;
2) The prompting of user actions via a display; and
3) The selective encryption of data, using stored banking keys.

As an EFTPOS device is used to facilitate the transfer of funds between accounts, it is often the target of criminal elements wishing to gain fraudulent access to monies. It is important, then, to understand that the following areas of an EFTPOS device may be open to attack or misuse by such elements:
1) Secure data entered on the keypad may be intercepted prior to encryption;
2) Secure prompts may be altered in an attempt to have the user enter secure data when no encryption is to take place (this alteration could be made to the secure prompt when in-situ of the EFTPOS controller, or en-route to the display); and 3) Banking keys may be extracted from the EFTPOS controller, allowing the attacker to decrypt secure data, and 'forge' messages to the bank.

These attacks are usually prevented by encapsulating the keypad, display and controller within a physically secure casing. The aim of this casing is to detect any attempt to tamper with the device, and render the device inoperable if such an attempt occurs. For this reason EFTPOS devices are usually stand alone devices and used only for the purpose of financial transactions. However, in recent times with the increase of communication technology and communication networks, consideration has been given to enabling EFTPOS transactions to be performed by a person using his or her mobile telephone.

The integration of EFTPOS functionality into personal devices such as mobile phones has hitherto not been accomplished, due mainly to the inability to prevent the attacks outlined above. The physical securing of the casing is too expensive for such a consumer device, and often complicates servicing.

The object of the invention is to provide a display device and a personal device, such as a mobile phone, which enables EFTPOS transactions to be performed with the required degree of security.

SUMMARY OF THE INVENTION

The invention may be said to reside in a display device for a personal device intended to perform financial transactions as well as personal functions other than financial transactions, the personal device including an input for receiving information from a user the display device including;
 a display section for displaying information to a user;
 a financial transaction controller coupled to the display; and
 the financial transaction controller being for selectively allowing the display section and input means to operate under the control of the personal device to enable personal functions other than financial transactions to be performed, and being for taking over control of the display section and the input means so that the personal device can perform a financial transaction whilst the display section and input means are under the control of the controller to thereby prevent the tampering with or tapping off of data entered into the input means or stored in the financial transaction controller during the performance of a financial transaction and also the display of information on the display section other than under the control of the financial controller.

Thus, according to this aspect of the invention the display device can be used in personal devices such as mobile telephones so that the mobile telephone can act in a normal fashion to make telephone calls, receive and forward text messages, etc. and, be placed into a secure condition for the performance of a financial transaction by taking over control of the display section and the input means. Thus the display section and input means cannot be accessed by the remainder of the personal device and information cannot be tapped off or manipulated by other components of the personal device during the performance of a financial transaction. The display device of the present invention enables a personal device such as a mobile telephone to be used as an EFTPOS terminal whilst maintaining the required security of data inputted into the device to perform the transaction, and also security of software, including encryption keys, which are required in order to perform the financial transaction. Thus, this enables a personal device such as a mobile telephone to be constructed which can also perform secure financial transactions simply by using the display device according to this invention in place of a conventional display device, whilst otherwise maintaining the mobile telephone in conventional configuration. Thus, additional security to the mobile phone is not required in order for the mobile phone to perform secure financial transactions.

In the preferred embodiment of the invention the financial controller is an EFTPOS controller and includes a processor, a display driver connected to the processor and also connected to the display section for driving the display section to display information, and a secure memory coupled to the processor for storing secure data and/or software.

Preferably the personal device includes controlling electronics, and the display device includes coupling means for coupling the processor with both the input means and the controlling electronics of the personal device.

Preferably the controller is physically attached to the display section.

In the most preferred embodiment the controller is physically attached to the display section by integrating the controller into the display section.

Preferably the controller is integrated into the display section by connecting the controller to the display section by means of attaching it to a printed circuit board that would normally house a display controller for controlling the display section.

Most preferably the display section is a liquid crystal display having a glass face and the controller is directly mounted onto the glass face of the liquid crystal display by a chip on glass process. Chip on glass processes are well known and therefore need not be further described herein.

The financial controller may be backed with an epoxy resin. The mounting of the controller may also include mounting in a flip chip configuration or providing a penetration detecting mesh formed on the controller. Once again, these techniques are well known and will not be described in further detail hereinafter.

The use of the epoxy resin, the flip chip configuration or the penetration detecting mesh further secure the controller and secures the data in the controller from attack.

Preferably the display device is mounted to the controlling electronics by a zero insertion force connector so that disassembly of the personal device will result in disconnection of the display device from the controlling electronics circuit board which can provide a trigger to cause data within the financial controller to be erased to prevent the data from being illegally accessed.

The erasing of data in the financial transaction controller can be achieved by a circuit loop-back in the zero insertion force connector so that the circuit is connected to the display device and completed in the device upon which the display section is mounted. Thus any removal of the display device will result in the circuit connection being broken and this disruption of the circuit is detectable by the controller on the display device to thereby result in the controller causing data, such as banking keys, to be erased so they cannot be illegally accessed.

Preferably, the input means with which the display device will be used in the personal device is a keypad. Most preferably the keypad is configured in accordance with the keypad disclosed in International patent application number PCT/AU01/00301, the contents of which are incorporated into this specification by reference in their entirety.

Security data and security software may also be loaded into the financial controller in accordance with the teachings in International patent application number PCT/AU01/00317, the contents of which are incorporated into this specification by reference in their entirety.

Preferably the financial controller is in the form of an application specific integrated circuit (ASIC).

In alternate embodiments the financial controller may be hybrid circuit.

In the preferred embodiment the financial transaction controller is configured so that it can control a multiplicity of the different displays thereby enabling the controller to be used with a variety of different display devices which may be intended for use in different types of personal devices.

Preferably, the personal device includes a communication means for transmitting data relating to the financial transaction to a financial transaction network and for receiving data from the financial transaction network. If the personal device is a mobile telephone, the communication means comprises the mobile telephone itself so that data which is assembled and encrypted by the financial controller is supplied to the controlling electronics of the mobile telephone for transmission by way of a mobile telephone call to the EFTPOS network and for receiving data back from the EFTPOS network by way of a mobile telephone call.

Thus, secure data is encrypted by the financial controller and forwarded to the controlling electronics of the mobile phone in encrypted state for transmission in a telephone call to the EFTPOS network. Security data transmitted back from the network is encrypted and received by the controlling electronics and forwarded to the financial controller in an encrypted state where it is processed by the financial controller. Thus, whilst the controlling electronics of the mobile phone are used to transmit and receive data that data is in an encrypted state and therefore secure before it is supplied to the controlling electronics of the mobile telephone.

In the preferred embodiment of the invention the device includes a controller input for activation by an operator to place the display device into a secure condition for performing a financial transaction. The controller input may be a menu item which can be displayed on the display as a person scrolls through a menu or an input button or the like on the device which is activated by the user.

Upon activation of the controller input the processor of the financial controller disconnects the controlling electronics of the personal device from the display section and the input means and takes over control of the input means and display section so that the financial transaction can be performed.

The invention, in a further aspect, may be said to reside in a financial transactions device for performing financial transactions as well as personal functions other than financial transactions, the device including:

an input means for the entry of data into the device;
a display section for displaying information to a user;
a financial transaction controller coupled to the display;
input means for the entry of data coupled to the controller;
personal device controlling electronics coupled to the financial transaction controller, for controlling the device to perform personal functions other than financial transactions; and
the financial transaction controller being for selectively allowing the display section and input means to operate under the control of the controlling electronics to enable personal functions other than financial transactions to be performed, and being for taking over control of the display section and the input means for preventing the controlling electronics from accessing the display and the input means so that the personal device can perform a financial transaction whilst the display section and input means are under the control of the controller to thereby prevent the tampering with or tapping off of data entered into the keypad or stored in the financial transaction controller during the performance of a financial transaction and also the display of information on the display section other than under the control of the financial controller.

Preferably, the financial transaction controller includes a processor, a display driver coupled to the processor and the display section, and a secure memory for storing software and/or data, coupled to the processor.

Preferably the controller is physically attached to the display section.

In the most preferred embodiment the controller is physically attached to the display section by integrating the controller into the display section.

Preferably the controller is integrated into the display section by connecting the controller to the display section by means of attaching it to a printed circuit board that would normally house a display controller for controlling the display section.

Most preferably the display section is a liquid crystal display having a glass face and the controller is directly mounted onto the glass face of the liquid crystal display by a chip on glass process. Chip on glass processes are well known and therefore need not be further described herein.

The controller electronics which operate the personal device preferably comprises, with the display section and input means, all of the electronics required in order to operate the personal device for performing personal functions other than financial transactions.

The invention may also be said to reside in a mobile telephone for performing financial transactions as well as mobile telephone calls other than financial transactions, the mobile telephone including:

an input means for the entry of data into the mobile telephone;

a display section for displaying information to a user;

controlling electronics for enabling a mobile telephone call to be performed with the mobile telephone;

a financial transaction controller coupled to the display section for selectively enabling the input means and the display to be coupled to the controlling electronics to enable mobile telephone calls other than financial transactions to be performed and for selectively disconnecting the controlling electronics from the display section and input means and taking over control of the display section and input means so that a financial transaction can be performed under the control of the financial controller without the controlling electronics of the mobile telephone being able to access the display section or the input means.

Preferably, the financial transaction controller includes an EFTPOS controller, a display driver coupled to the EFTPOS controller and to the display section, and a secure memory coupled to the processor for storing security software and/or data.

Preferably, the coupling means is provided for coupling the processor with both the keypad and the controlling electronics of the personal device.

Preferably, the controller is physically attached to the display section.

In the most preferred embodiment, the controller is physically attached to the display section by integrating the controller into the display section.

Preferably, the controller is integrated into the display section by connecting the controller to the display section by means of attaching it to a printed circuit board that would normally house a display controller for controlling the display section.

Most preferably, the display section is a liquid crystal display having a glass face and the controller is directly mounted onto the glass face of the liquid crystal display by a chip on glass process. Chip on glass processes are well known and therefore need not be further described herein.

Preferably the financial transaction controller enables communication between the controlling electronics, the display section and the input means during the performance of personal functions other than financial transactions.

Preferably, when the device is in the secure condition for performing a financial transaction, the controlling electronics cannot access the display section or the input means but the financial controller can output data to the controlling electronics so that the data can be transmitted in a mobile telephone call to a financial system network.

Preferably the input means comprises a keypad.

However, in other embodiments the input means may be integrated into the display device and be in the form of a touch screen provided in the display section.

BRIEF DESCRIPTION OF THE DRAWINGS

A preferred embodiment of the invention will be described, by way of example, with reference to the accompanying drawings in which.

DESCRIPTION OF THE PREFERRED EMBODIMENTS

Figure 1:
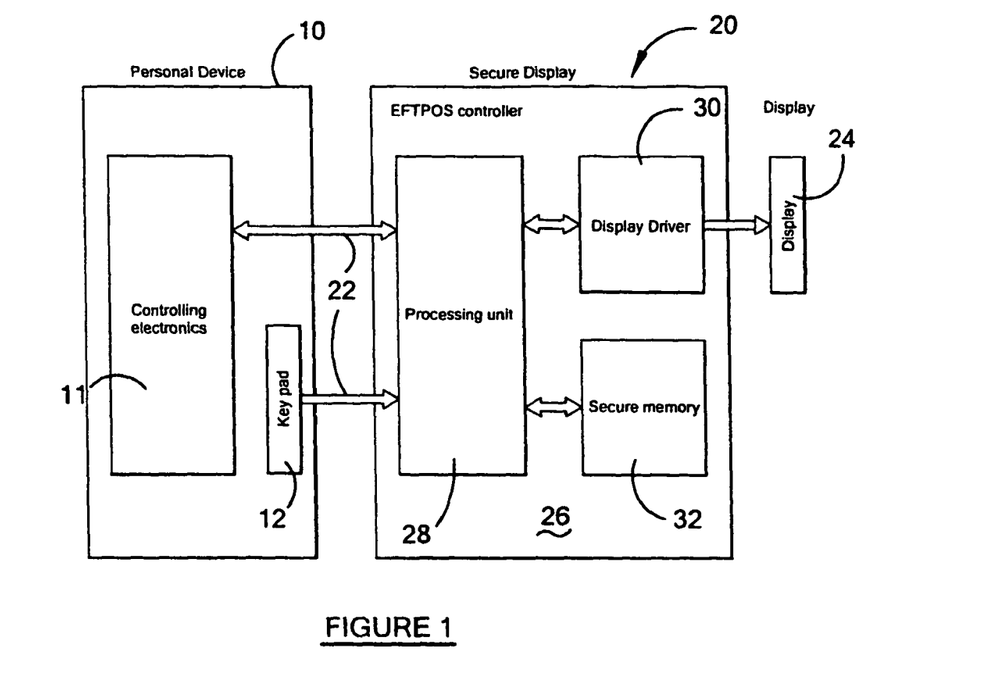
FIG. 1 is a circuit block diagram according to one embodiment of the invention.

With reference to FIG. 1 a block diagram of a personal device such as a mobile telephone is shown which includes a secure display device for enabling financial transactions such as EFTPOS transactions to be performed.

The mobile telephone includes a personal device section 10 which enables mobile telephone calls to be made and received. The personal device 10 also includes a keypad 12 into which data such as a telephone number or data to forward a text message or the like can be input. The personal device 10 also includes controlling electronics 11 which are conventional electronics which process and receive incoming and outgoing calls and operate the mobile telephone in accordance with conventional protocols.

A secure display device 20 is located in the mobile telephone in place of a conventional display which would otherwise be used with the mobile telephone. The secure display 20 enables financially secure transactions to be performed with the mobile telephone without fear that data can be illegally tapped from the mobile telephone (during the performance of a financial transaction) or that incorrect or bogus data could be supplied to the mobile telephone to cause a user to input security information, which could then be illegally accessed by another party.

The display section 20 is coupled to the controlling electronics 11 and the keypad 12 by a connection such as a zero insertion force connector, for example, a zebra strip type connector schematically shown by reference 22 in FIG. 1.

The display section 20 includes a display 24, preferably in the form of a liquid crystal display, and an EFTPOS controller 26. The EFTPOS controller 26 includes: a processor 28 (which is connected to the controlling electronics 11 of the mobile telephone 10 by the connector 22), a display driver 30 (which is coupled to the processor 28 and also to the display 24 for driving the display 24), and a secure memory 32 (which is coupled to the processor 28 for storing security data and/or software).

In the preferred embodiment of the invention, the keypad 12 is preferably configured so that it is not possible to illegally determine which keys of the keypad 12 are depressed during the input of information into the keypad 12. Most preferably, the keypad 12 is configured in accordance with the keypad disclosed in the aforementioned International application number PCT/AU001/00301.

The secure memory 32 is loaded with security software and data, such as encryption keys, in a secure environment to enable the financial transaction and, in particular, an EFTPOS transaction, to be performed with the mobile telephone. This data is loaded when the secure display device 20 is manufactured and before the device is assembled into a mobile telephone. However, the software and data could be loaded after assembly of the display device 20, into the mobile telephone, if desired.

Preferably, the security software and data is loaded into the secure memory 32 in accordance with the teachings of the aforesaid International patent application number PCT/AU01/00317.

In order to perform a mobile telephone call that is not a financial transaction, the mobile telephone is used in the conventional way. In this condition, the controlling electronics 11 is coupled to the display driver 30 and to the display 24 by the processor 28. The controlling electronics 11 can also control the keypad 12, via the processor 28, so that telephone numbers, data for text messages and the like, as well as normal control functions of the mobile telephone can be performed.

When it is desired to perform a financial transaction, such as an EFTPOS transaction which will transfer funds from one person's bank account to another person's bank account in order to pay for the purchase of goods or services, the mobile telephone is activated to place the mobile telephone into the secure condition. This is performed by depression of a button (not shown) or other input device on the mobile telephone or by scrolling through a menu of the mobile telephone until an EFTPOS transaction is displayed and selected. When the mobile telephone is placed into the secure condition, the processing unit receives data either by way of the menu selection or the depression of the button, etc. and acts to disconnect the display 24 and keypad 12 from the controlling electronics 11 of the mobile telephone and also takes over command of the display 24 and keypad 12 so that they cannot operate under the command of the controlling electronics 11 of the mobile telephone.

Figure 6:
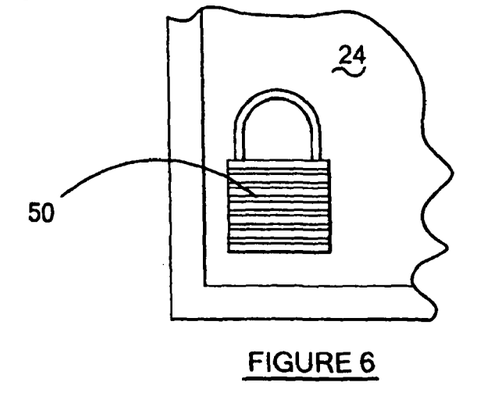
FIG. 6 is an enlarged view of part of the display device of FIG. 4.

In order to show that the mobile telephone is in the secure condition, an icon, such as a padlock or other indicating device to clearly indicate to a user that the device is properly placed in the secure condition, may be displayed on the display 24 (as is shown in FIG. 6). Preferably, the icon is displayed by way of a single pixel which is only ever under the control of the EFTPOS controller 26 so that it can only be activated when the device is placed in the secure condition. Most preferably the pixel is a large pixel so that it is sufficiently big to be easily observed by a user.

When the device is in the secure condition, the processor 28 effectively acts as a switch to switch off the controlling electronics 11 from the keypad 12 and display 24 until the user indicates that the secure condition is no longer required. When in the secured condition, the EFTPOS controller 26 takes over control of the keypad 12 and the display 24 and causes the required prompts to be displayed on the display 24 for performing of financial transactions. These prompts will enable the input of data relating to the user's bank account which can be performed by swiping an EFTPOS card or credit card, the encryption of that data and the transferring of that data to the controlling electronics 11 of the mobile telephone so that the data can be transmitted by way of a mobile telephone call to an EFTPOS network. Similarly, the processor 28 will then prompt the user to input a pin into the keypad 12, which is encrypted and transmitted (by way of a mobile telephone call) to the EFTPOS network. Unsecure data, such as the purchase amount, may then be input and transmitted. The manner in which the data is assembled and transmitted is conventional and therefore need not be described in any further detail herein.

The data received back from the network will include the fact that the transaction has been approved which can also be displayed on the display 24.

Because the financial transaction is under the control of the EFTPOS controller 26 and the controlling electronics 11 of the mobile telephone is completely disconnected from the operation of the financial transaction, bogus messages which would prompt a user to input secure information when secure information is not actually called for cannot be made. This would, otherwise, enable secure information to possibly be input and transmitted unencrypted so that it could be accessed by unauthorized parties. This can be prevented from happening because the display 24 cannot be accessed by the controlling electronics and therefore any attempt to transmit a message to the mobile telephone and into the controlling electronics so that the controlling electronics will control the display, such as text message or the like, will not be received by the display. Similarly, the controller ensures that the required security data is properly encrypted before supply to the controlling electronics 11 and transmission from the mobile telephone.

Thus, the EFTPOS controller 26 contains all the necessary components and logic functions to perform EFTPOS transactions, as well as scan the keypad 12 and control the display 24 to which it is attached. The controller 26 itself is secured against attack through the use of detection technology, such as penetrating protecting die meshes formed over the circuit (s) to detect removal of the display section 24 from the personal device compartment 10 of the mobile telephone. The epoxy resin backing on security sensitive components, such as the processor 28 and secure memory 32, or most preferably on the entire controller 26, may also be provided.

Figure 2:
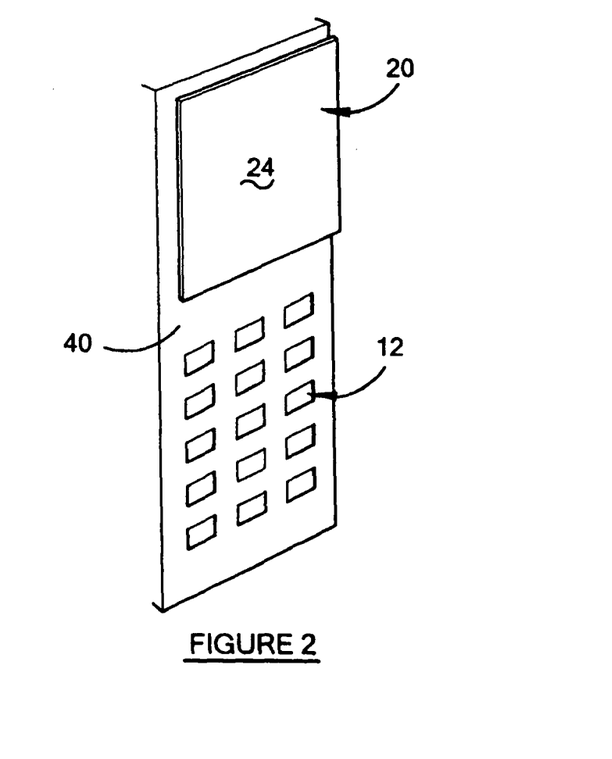
FIG. 2 is a view of a personal device such as relevant parts of a mobile telephone.

FIG. 2 shows a diagram of a mobile telephone (that is the relevant parts of the mobile telephone), which the invention may be used. The display device 20 includes the liquid crystal display 24 which is mounted onto a printed circuit board 40 which carries the controlling electronics 11 and keypad 12 of the mobile telephone 10. As previously mentioned the display section 20 is connected to the controlling electronics (and therefore to the board 40), by the zero insertion force connector 22.

Figure 3:
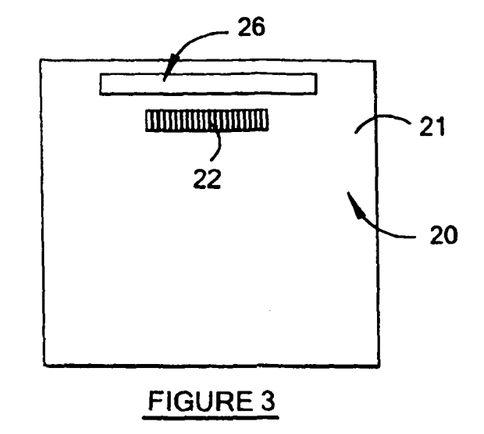
FIG. 3 is a back view of a display device according to the preferred embodiment.

FIG. 3 shows a rear view of the display device 20 in which the connector 22 is schematically shown for coupling the display device 20 to the control electronics 11 and keyboard 12. The EFTPOS controller 26 is also schematically shown connected to glass face 21 of the liquid crystal display 24 by way of a chip on glass mounting method.

Figure 4:
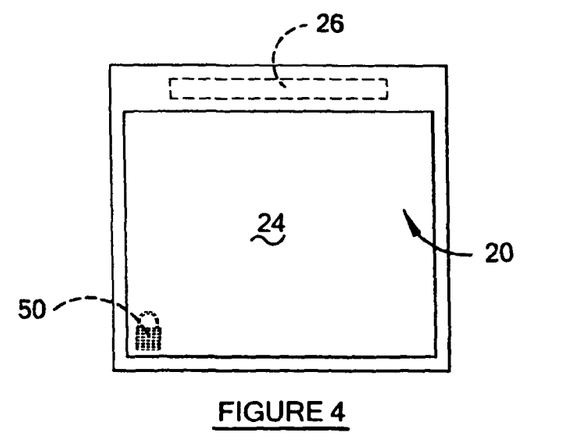
FIG. 4 is a front view of the display device of FIG. 3.

FIG. 4 shows a front view of the display device 20 which illustrates the viewable area of the display 24.

Figure 5:
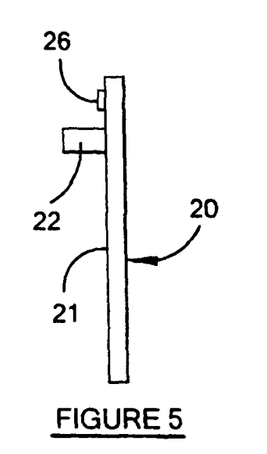
FIG. 5 is a side view of the display device of FIGS. 3 and 4.

FIG. 5 shows a side view of the display section 20.

In FIG. 6 a part of the display 24 viewable area is shown which features the secure indicator 50 which may be in the form of a representation of a padlock or any other suitable device and, which as noted above, is preferably formed as a single pixel which can be activated under the control of the processor 28, but which cannot be activated by the controlling electronics 11 of the mobile telephone 10. In this manner, the security indicator 50 cannot be caused to be displayed other than when the user actually selects the security condition of the mobile telephone to perform an EFTPOS transaction. Thus, the secure indicator 50 is an icon which is a singularly addressably formed icon on the display 24 and is not a graphical representation formed from multiple pixels.

Figure 7:
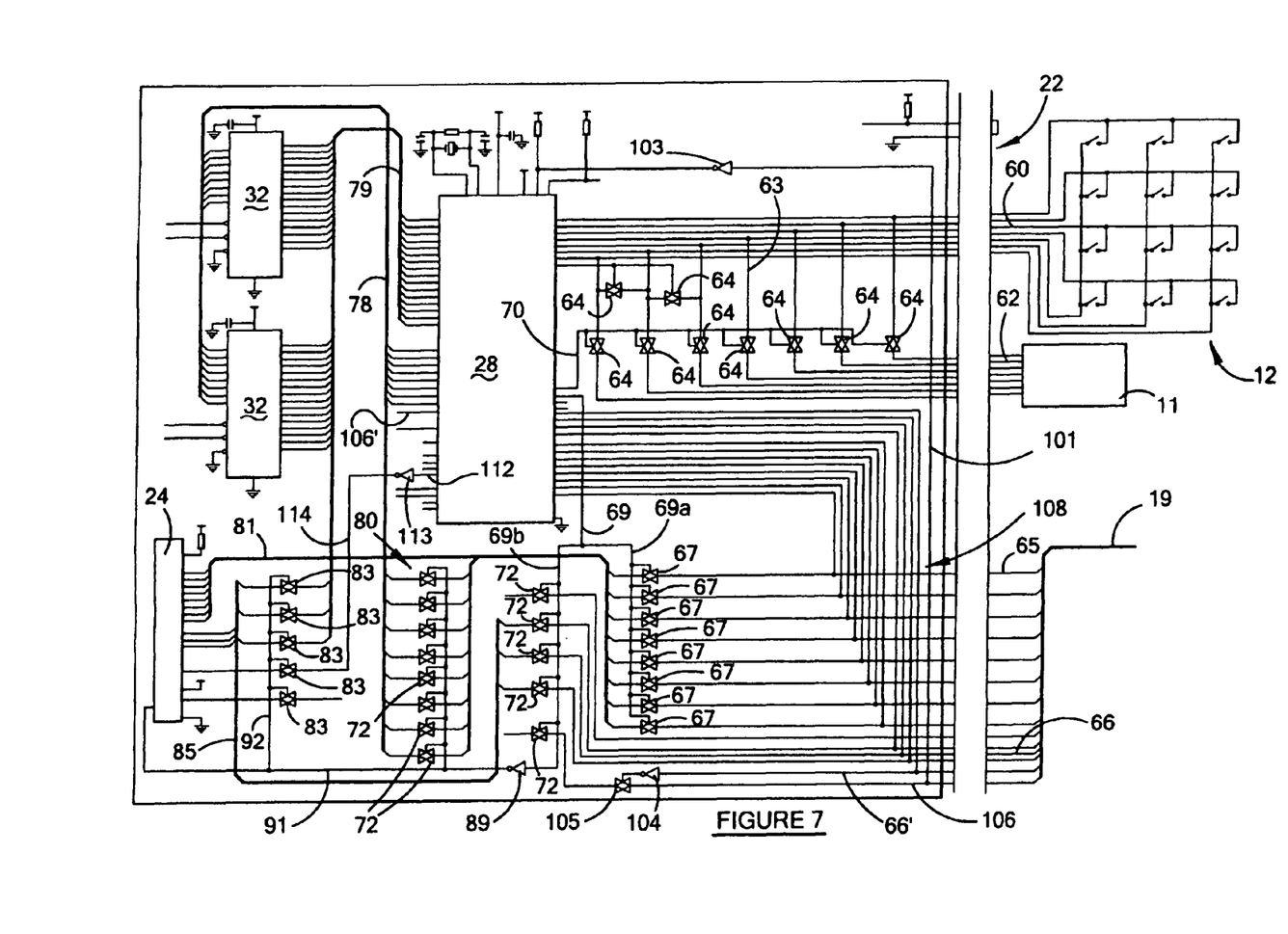
FIG. 7 is a block circuit diagram of the preferred embodiment.
Figure 8:
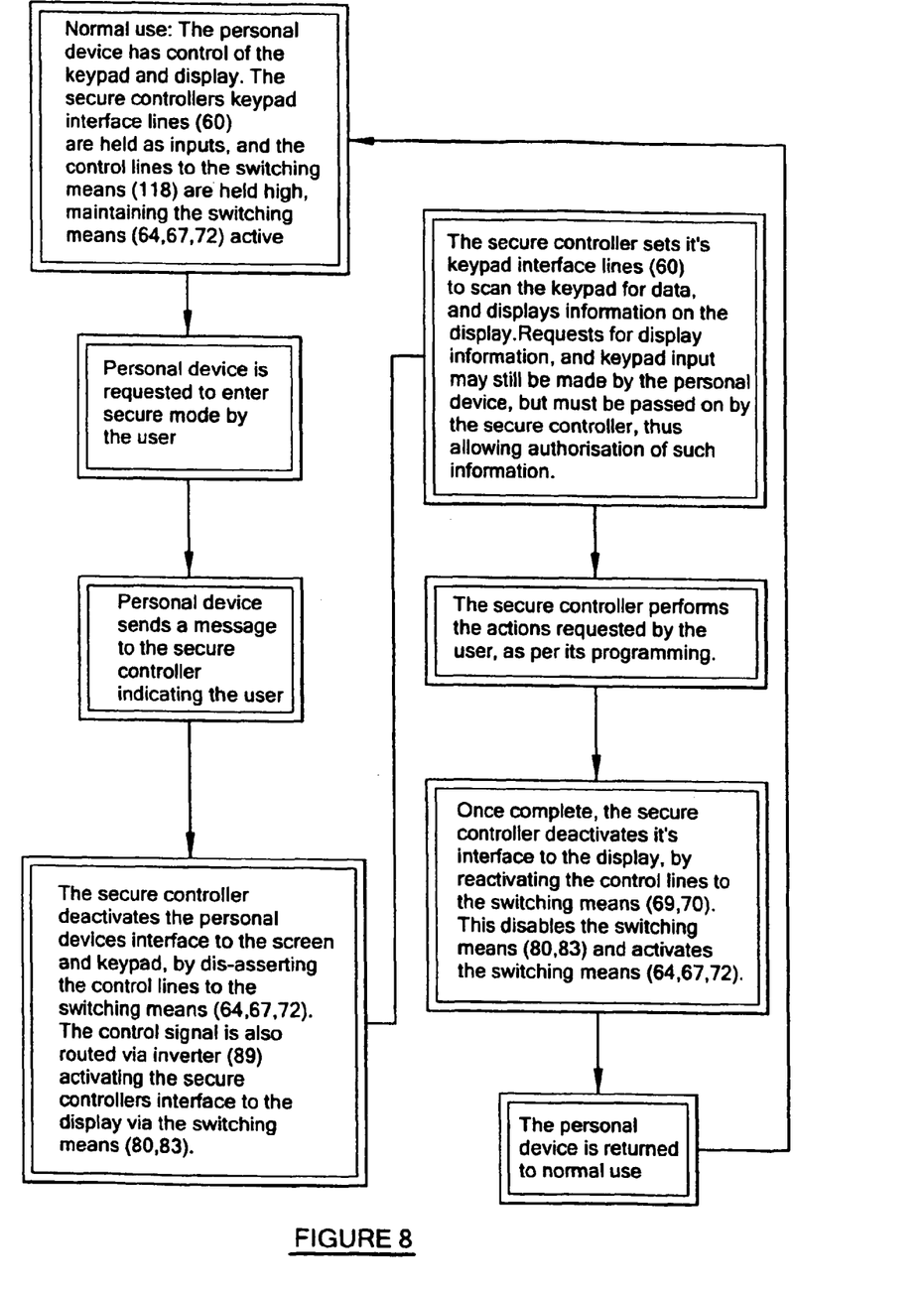
FIG. 8 is a flow chart explaining operation of the diagram of FIG. 7.

With reference to FIGS. 7 and 8 (which show a block diagram of the preferred embodiment of the invention and a flow chart explaining operation of the diagram of FIG. 7, respectively), keypad 12 is separated from the controlling electronics 11 by connector 22, as previously described. The connector 22 connects the keypad 12, via interface lines 60, to processor 28. The personal device keypad control circuitry and other controlling electronics 11 are also connected to the processor 28, via the connector 22, as is bus 19 which forwards data to the display 24 under the control of the electronics 11. The interface lines 60 are connected to lines 62 which in turn connect to the electronics 11 by lines 63, which include field-effect transistors 64. In usual operation, signals from the keypad 12 can travel via lines 60, 63, transistors 64 and lines 62 to the controlling electronics 11. These signals are then processed by the controlling electronics 11 and may result in an output to the display 24 on bus 19. The bus 19 connects with data lines 65 and address lines 66. The data lines 65 each include field-effect transistors 67 and the field-effect transistors 67 are connected to line 69 which in turn connects to the processor 28. Line 70 from the processor 28 also connects to each of the transistors 64.

Line 69 also connects to field effect transistors 72 which are provided in address lines 66.

The processor 28 also connects to memories 32 via data bus 78 and address bus 79. The data bus 78 also connects to a series of field-effect transistors 80 and then, via bus 81, to display 24. Bus 79 also connects field-effect transistors 83 to bus 85, which in turn is connected to display 24.

Line 69 breaks into a first branch 69a which connects with the transistors 67 and a second branch 69b which connects with the transistors 72. The branch 69b includes an inverter 89, which is connected via lines 91 and 92 to the transistors 83.

All the field-effect transistors described above function as bi-directional switches and in usual operation allow flow of signals from the keypad 12 to the controlling electronics 11 and from the data bus 19 to the display 24 so that the display 24 can be used as display information under control of the electronics 11, such as when telephone calls are made, etc.

One of the address lines 66 (that labelled 66') is connected an inverter 104, which in turn connects with a field-effect transistor 105 in LCD enable line 106. The line 106 connects with one of the transistors 72 and then to the enable port of the display 24 (i.e., the same port to which line 114 connects) to produce an enable signal to the display 24. When the signal on line 106 is high the display 24 is enabled so that the display 24 can be controlled by data provided on the address line 66 and data line 65 which are connected to the display 24 by the buses 81 and 85, respectively. The signal on line 106 is also provided to inverter 103 by line 101 and acts as an interrupt so that the processor can monitor the signals on the data line 65 and address line 66, via lines 118, to determine whether those signals are intended for the processor 28.

When it is desired to place the device into security mode, a key or code can be keyed into the keyboard 12 which is received by the processor 28 in the manner referred to above. A high signal on address line 66', which may form part of the code, will cause the inverter 104 to output a low signal to turn off the transistor 105 and disable the display 24 from control by the electronics 11 and the data bus 19.

When the processor 28 receives the indication that security mode is required, the processor 28 outputs a signal on lines 69 and 70 so as to change the state of the field-effect transistors 64 and 67. The change in state of the signal on line 69 is inverted by inverter 89 which switches on the field effect transistors 80 and 83 so that the display 24 can be addressed and data provided to display 24 from the memories 32 under the control of the processor 28. Input commands from the keypad 12 can then only pass to display 24 from the line 60, via the processor 28, and then from the processor 28 to the display 24. Since the transistors 64, 67 and 72 are switched off, it is not possible for the controlling electronics 11 or the data bus 19 to access the keypad 12 or the display 24.

The processor 28 also outputs a signal on line 112 which is inverted by inverter 113 so that a signal is provided on line 114 for enabling the LCD display 24 (so the display can display the data received on the bus 81) under the control of the processor 28 and also receive read/write signals from processor 28, via lines 106' and 106".

The signal on line 69b is also inverted by the inverter 89 and supplied to the processors 28 to cause the processor 28 to display the icon showing that the device is in the security mode.

When the secure functions, such as the EFTPOS transaction, is completed, the device can return to its normal state by changing the status of the outputs on lines 69 and 70. This reactivates the field-effect transistors 64,67 and 72 so that the keypad 12 can again communicate with the controlling electronics 11 and signals outputted on data bus 19 direct to display 24. The change in status of the signal on line 69 also switches off the transistors 80 and 83.

According to the preferred embodiment of the invention the display device 20 becomes the master of both the display 24 and keypad 12. During normal use, the personal device, such as the mobile telephone 10, is allowed by the controller 26 to display information on the display 24, and also receive information from the keypad 12. However, when the device is placed into the secure condition the controlling electronics 11 cannot access the display 24 nor receive information from the keypad 12. In this mode the controller 26 switches control of the keypad 12 and the display 24 from the controlling electronics 11 to itself and switches on the icon 50 to show that the mobile telephone is now in the secure condition in which a financial transaction can be performed.

The mobile phone can then perform a secure EFTPOS transaction, whilst preventing the personal device 10 from intercepting, viewing or tampering with any of data passed between itself, the user, and the EFTPOS network. Once a transaction is complete, control of the display 24 and the keypad 12 is passed back to the personal device 10 itself, and the EFTPOS controller resumes it passive display role in which it merely enables transmission of information from the controlling electronics 11 to/from the display 24 and keypad 12.

Since modifications within the spirit and scope of the invention may readily be effected by persons skilled within the art, it is to be understood that this invention is not limited to the particular embodiment described by way of example hereinabove.

The invention claimed is:

1. A display device for a personal device intended to perform financial transactions as well as personal functions other than financial transactions, the display device comprising:
    a display for displaying information to a user; and
    a financial transaction controller coupled to the display, wherein the financial transaction controller selectively allows the display and an input device to operate under the control of the personal device to enable personal functions other than financial transactions to be performed, and wherein the financial transaction controller assumes control of the display and the input device to prevent tampering with or tapping off of data entered into the input device or stored in the financial transaction controller during a financial transaction.

2. The display device of claim 1, wherein the financial transaction controller is an electronic funds transfer point of sale (EFTPOS) controller that includes a processor, a display driver connected to the processor and a secure memory coupled to the processor, and wherein the secure memory stores secure data and the processor is coupled to the display by the display driver.

3. The display device of claim 2, wherein the personal device includes controlling electronics, and wherein the display device includes circuitry for coupling the processor to the input device and the controlling electronics of the personal device.

4. The display device of claim 3, wherein the display device is coupled to the controlling electronics of the personal device by a zero insertion force connector, and wherein disconnection of the display device from the controlling electronics provides a trigger signal that causes data within the financial transaction controller to be erased to prevent unauthorized access of the data.

5. The display device of claim 4, wherein a circuit loopback in the zero insertion force connector provides the trigger signal to the financial transaction controller, and wherein the data includes a banking key.

6. The display device of claim 1, wherein the financial transaction controller is physically attached to the display.

7. The display device of claim 1, wherein the financial transaction controller is integrated with the display.

8. The display device of claim 1, wherein the financial transaction controller is integrated with the display by connecting the financial transaction controller to a printed circuit board (PCB) that includes a display driver for controlling the display.

9. The display device of claim 1, wherein the display is a liquid crystal display (LCD) having a glass face and the financial transaction controller is directly mounted onto the glass face of the LCD by a chip on glass process.

10. The display device of claim 1, wherein the input device is a keypad.

11. The display device of claim 1, wherein the financial transaction controller is an application specific integrated circuit (ASIC).

12. The display device of claim 1, wherein the financial transaction controller is a hybrid circuit.

13. The display device of claim 1, wherein the financial transaction controller is configured to selectively control a plurality of different displays that may be used in different types of personal devices.

14. The display device of claim 1, wherein the personal device includes a communication circuit for transmitting data relating to the financial transactions to a financial transaction network and for receiving data from the financial transaction network.

15. The display device of claim 1, wherein the personal device includes an input for activation by an operator to place the display device in a secure condition for performing a financial transaction.

16. The device of claim 15, wherein the financial transaction controller includes a processor, a display driver coupled to the processor and a secure memory coupled to the processor, and wherein the secure memory stores secure data and the processor is coupled to the display by the display driver.

17. A financial transaction device for performing financial transactions as well as personal functions other than financial transactions, the device comprising:
    an input device for the entry of data into the financial transaction device;
    a display for displaying information to a user;
    a financial transaction controller coupled to the display and the input device; and
    a personal device including controlling electronics coupled to the financial transaction controller,
    wherein the personal device is configured to control the financial transaction device to perform personal functions other than financial transactions, and
    wherein the financial transaction controller selectively allows the display and the input device to operate under the control of the controlling electronics to enable personal functions other than financial transactions, where the financial transaction controller assumes control of the display and the input device to prevent the controlling electronics from accessing the display and the input device to prevent tampering with or tapping off of data entered into the input device or stored in the financial transaction controller during a financial transaction.

18. The device of claim 17, wherein the financial transaction controller is physically attached to the display.

19. The device of claim 17, wherein the financial transaction controller is integrated with the display.

20. The device of claim 17, wherein the financial transaction controller is integrated with the display by connecting the financial transaction controller to a printed circuit board (PCB) that includes a display driver for controlling the display.

21. The device of claim 17, wherein the display is a liquid crystal display (LCD) having a glass face and the financial transaction controller is directly mounted onto the glass face of the LCD by a chip on glass process.

22. The device of claim 17, wherein the controlling electronics include a communication circuit for transmitting and receiving information.

23. A mobile telephone for performing financial transactions as well as mobile telephone calls other than financial transactions, the mobile telephone comprising:
    an input device for the entry of data into the mobile telephone;
    a display for displaying information to a user;
    controlling electronics for enabling a mobile telephone call to be performed with the mobile telephone;
    a financial transaction controller coupled to the display, wherein the financial transaction controller selectively allows the input device and the display to be coupled to the controlling electronics to enable mobile telephone calls other than financial transactions, and wherein the financial transaction controller disconnects the controlling electronics from the display and the input device and assumes control of the display and the input device to perform a financial transaction.

24. The telephone of claim 23, wherein the financial transaction controller is an electronic funds transfer point of sale (EFTPOS) controller that includes a processor, a display driver coupled to the processor and a secure memory coupled to the processor, and wherein the secure memory stores secure data and the processor is coupled to the display by the display driver.

25. The telephone of claim 24, wherein the processor is also coupled to the input device and the controlling electronics of the personal device.

26. The telephone of claim 23, wherein the financial transaction controller is physically attached to the display.

27. The telephone of claim 23, wherein the financial transaction controller is integrated with the display.

28. The telephone of claim 23, wherein the financial transaction controller is integrated with the display by connecting the financial transaction controller to a printed circuit board (PCB) that includes a display driver for controlling the display.

29. The telephone of claim 23, wherein the display is a liquid crystal display (LCD) having a glass face and the financial transaction controller is directly mounted onto the glass face of the LCD by a chip on glass process.

30. The telephone of claim 23, wherein the financial transaction controller enables communication between the controlling electronics, the display and the input device during the performance of personal functions other than financial transactions.

31. The telephone of claim 23, wherein the controlling electronics cannot access the display or the input device during a financial transaction, and wherein the financial transaction controller communicates with the controlling electronics to facilitate data transmission and reception for a financial transaction in a mobile telephone call to a financial system network.

32. The telephone of claim 23, wherein the input device is a keypad.

* * * * *

UNITED STATES PATENT AND TRADEMARK OFFICE
CERTIFICATE OF CORRECTION

Page 1 of 1

PATENT NO. : 7,904,338 B2
APPLICATION NO. : 10/516445
DATED : March 8, 2011
INVENTOR(S) : Jamieson It is certified that error appears in the above-identified patent and that said Letters Patent is hereby corrected as shown below:

On the title page 2, in item [56], under "Foreign Patent Documents" in Column 1, Line 2, below "WO WO 9422116 9/1994" insert -- EP    0456548    6/1995
                    WO    WO 00/028490    5/2000
                    WO    WO 01/006466    1/2001 --.

Column 11, line 11, in Claim 1, after "device" delete "intended".

Signed and Sealed this
Eighth Day of November, 2011

David J. Kappos
*Director of the United States Patent and Trademark Office*